Patented June 16, 1936

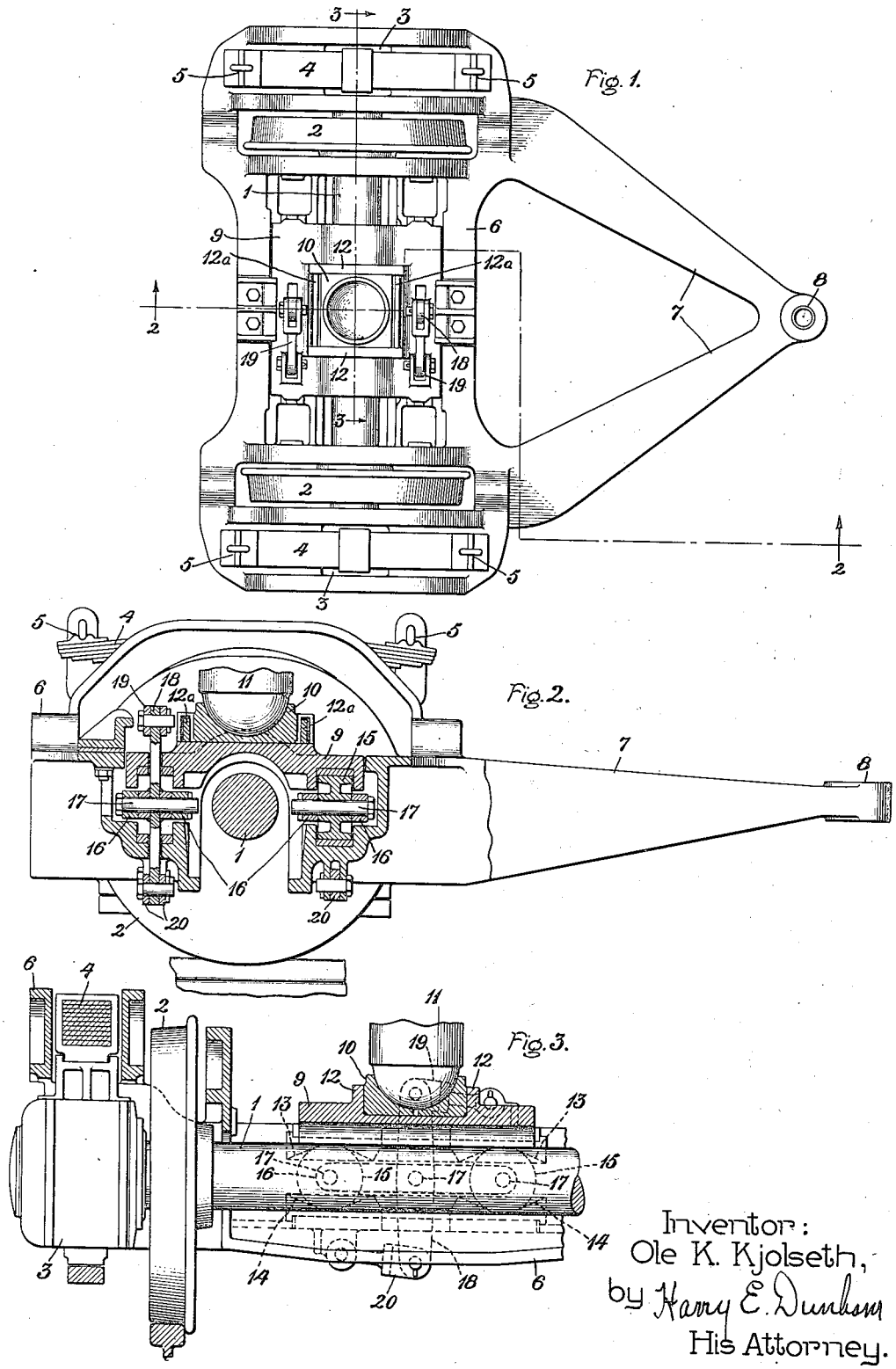

2,044,575

UNITED STATES PATENT OFFICE 2,044,575

RADIAL GUIDING TRUCK

Ole K. Kjolseth, Erie, Pa., assignor to General Electric Company, a corporation of New York Application July 5, 1934, Serial No. 733,832

8 Claims. (Cl. 105—174)

My invention relates to radial guiding trucks.

An object of my invention is to provide an improved guiding truck having radial movement with respect to a locomotive or car frame supported thereon. I accomplish this object by supporting the locomotive or car on a bolster having a movable center plate guided longitudinally of the truck, and by providing a lateral restraint device for resisting lateral movement of the bolster with respect to the truck.

Further objects and advantages of my invention will become apparent as the following description proceeds, and the features of novelty which characterize my invention will be pointed out with particularity in the claims annexed to and forming a part of this specification.

In the accompanying drawing Fig. 1 is a plan view of a radial guiding truck embodying my invention; Fig. 2 is a sectional view on line 2—2 of Fig. 1; and Fig. 3 is a sectional view on line 3—3 of Fig. 1.

Referring to the drawing, I have shown my invention in connection with a radial guiding truck having a single axle 1 provided with wheels 2 and outside journal boxes 3 on which the truck frame 6 is supported. The truck frame is supported on the axle by leaf springs 4 connected at the ends 5 to the truck frame and resting on the journal boxes intermediate the ends. The truck frame 6 has radially extending arms 7 which may be pivotally connected at 8 to the locomotive frame or to an adjacent truck frame.

The truck is provided with a bolster 9 carrying a center plate 10 on which the locomotive or car may be supported by a center pin 11 connected thereto. The center plate 10 is confined between longitudinal guides 12 formed in the bolster which allow longitudinal movement of the center plate, and a lubricating oil well is formed by plates 12a secured to the guides.

Lateral movement of the bolster is resisted by a gravity centering device of the type shown in my Patent 1,751,336, assigned to the General Electric Company, assignee of this invention, although other lateral restraint devices may be used. This centering device comprises blocks having oppositely sloping surfaces 13 and 14 (Fig. 3) which are respectively secured to the bolster and to the truck frame, and rolls 15 which engage the sloping surfaces and transmit the weight from the bolster to the truck frame. Side links 16 extend on either side of the rolls 15 and are connected thereto by pins 17. By this arrangement, the rolls 15 are moved together in the operation of the centering device. In order to maintain the rolls 15 in the proper position, a vertical link 18 is connected intermediate its ends to the side links 16, and the upper and lower ends of the vertical link are respectively connected to the bolster and the truck frame by links 19 and 20. The links 19 and 20 are pivotally connected at either end. In this construction when the bolster 9 is moved laterally in either direction with respect to the truck frame 6, the linkage including links 19 and 20 and the vertical link 18, will cause the rolls 15 to be displaced relative to the sloping surfaces 13 and 14, and will cause the weight carried by the bolster 9 to resist the lateral displacement and will cause the bolster to be returned to the central position shown in Fig. 3, as soon as the displacing force is removed. During the lateral displacement of the bolster, the center plate 10 moves longitudinally between the guides 12, and this movement prevents strains being transmitted from the center pin 11 to the arms 7 of the truck frame 6. With this construction, it is possible to have a radially movable truck with a rigid frame having a simple pivotal connection to the locomotive frame or to an adjacent truck, thus eliminating a complicated linkage for connecting the guiding truck to the locomotive or car underframe or an adjacent truck.

Although I have shown a particular embodiment of my invention, I do not desire to be limited to the construction described, and I intend in the appended claims to cover all modifications which do not depart from the spirit and scope of my invention.

What I claim as new and desire to secure by Letters Patent of the United States is:

1. In combination with a locomotive or car, a radially movable guiding truck, a bolster on said truck movable laterally with respect to said truck, said bolster having a guide extending longitudinally of said truck, a longitudinally movable center plate carried by said bolster and engaging said guide, and means for restraining lateral movement of said bolster.

2. In combination with a locomotive or car, a radially movable guiding truck, a bolster on said truck movable laterally with respect to said truck, said bolster having a guide extending longitudinally of said truck, a longitudinally movable center plate carried by said bolster and engaging said guide, and a gravity centering device for restraining lateral movement of said bolster.

3. In combination with a locomotive or car, a truck movable laterally with respect thereto, a bolster on said truck movable laterally with respect to said truck, said bolster having a guide extending longitudinally of said truck, a longitudinally movable center plate carried by said bolster and engaging said guide, said bolster having a sloping surface between said bolster and said truck, a movable member engaging said surface for supporting the weight carried by said truck, and a linkage connected to said truck and said bolster for moving said member relative to said sloping surface upon lateral displacement of said truck.

4. In combination with a locomotive or car, a truck movable laterally with respect thereto, a bolster on said truck movable laterally with respect to said truck, said bolster having a guide extending longitudinally of said truck, a longitudinally movable center plate carried by said bolster and engaging said guide, said bolster having a plurality of sloping surfaces between said bolster and said truck, a plurality of interconnected rollers arranged between said bolster and said truck for supporting the weight carried by said bolster on said truck, and a linkage connected to said bolster and said truck for moving said rollers relative to said surfaces upon lateral displacement of said truck.

5. In combination with a locomotive or car, a radially movable guiding truck, a bolster on said truck movable laterally with respect to said truck, said bolster having guides extending longitudinally of said truck, means including plates extending between said guides for forming a lubricant reservoir, a longitudinally movable center plate engaging said guides and carried by said bolster within said lubricant reservoir, and means for restraining lateral movement of said bolster.

6. In combination with a locomotive or car, a truck movable laterally with respect thereto, a bolster on said truck movable laterally with respect to said truck, said bolster having guides extending longitudinally of said truck, means including plates extending between said guides for forming a lubricant reservoir, a longitudinally movable center plate engaging said guides and carried by said bolster within said lubricant reservoir, said bolster having an inclined surface between said bolster and said truck, a movable member engaging said surface for supporting said bolster on said truck, and a linkage connected to said truck and to said bolster for moving said member relative to said inclined surface upon lateral displacement of said truck.

7. In combination with a locomotive or car, a radially movable guiding truck, means including a bolster on said truck movable laterally thereof and a longitudinally movable center plate carried by said bolster for providing a laterally and longitudinally movable center bearing plate, and means for restraining lateral movement of said bolster.

8. In combination with a locomotive or car, a radially movable guiding truck, means including a bolster on said truck movable laterally thereof and a longitudinally movable center plate carried by said bolster for providing a laterally and longitudinally movable center bearing plate, means for guiding said center plate and for providing a lubricant reservoir in which said center plate is carried on said bolster, and means for restraining lateral movement of said bolster.

OLE K. KJOLSETH.